US010302006B2

(12) United States Patent
Seo et al.

(10) Patent No.: US 10,302,006 B2
(45) Date of Patent: May 28, 2019

(54) INTAKE APPARATUS FOR ENGINE

(71) Applicant: HYUNDAI KEFICO CORPORATION, Gunpo, Gyeonggi-do (KR)

(72) Inventors: Chang Woo Seo, Gyeonggi-do (KR); Suk Young Kim, Seoul (KR); Young Jin Kim, Seoul (KR); Ji Sun Kim, Gyeonggi-do (KR); Ba Ro Han, Seoul (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 0 days.

(21) Appl. No.: 15/821,380

(22) Filed: Nov. 22, 2017

(65) Prior Publication Data
US 2018/0142609 A1 May 24, 2018

(30) Foreign Application Priority Data
Nov. 23, 2016 (KR) .......... 10-2016-0156621

(51) Int. Cl.
F02D 9/08 (2006.01)
F02M 35/10 (2006.01)
(Continued)

(52) U.S. Cl.
CPC ....... *F02B 31/06* (2013.01); *F02M 35/10078* (2013.01); *F02M 35/10262* (2013.01);
(Continued)

(58) Field of Classification Search
CPC .......... F02D 9/101; F02D 9/1005; F02D 9/08; F02D 9/1015; F02D 9/102; F02B 27/0278; F02B 27/0273; F02M 35/10255
(Continued)

(56) References Cited

U.S. PATENT DOCUMENTS 2,994,517 A * 8/1961 Fenton .................... F02D 9/101
261/36.2
3,057,606 A * 10/1962 Olav ....................... F02D 9/101
261/65
(Continued)

FOREIGN PATENT DOCUMENTS

JP H06264816 A 9/1994
JP H08277717 A 10/1996
(Continued)

Primary Examiner — John Kwon
(74) Attorney, Agent, or Firm — Mintz Levin Cohn Ferris Glovsky and Popeo, P.C.; Peter F. Corless

(57) ABSTRACT

An intake apparatus for an engine is provided. The intake apparatus includes an intake manifold configured to draw intake air thereinto, a cylinder head having an intake port through which intake air drawn from the intake manifold is supplied into a cylinder of the engine and a flow control valve disposed in the intake manifold and configured to control a flow direction of intake air to be drawn from the intake manifold into the cylinder head to generate a circular flow in the intake air. A port plate is configured to reinforce the circular flow of intake air that is generated in the flow control valve and a plate support is coupled with the port plate and coupled between the intake manifold and the cylinder head to enable the port plate to be inserted into the intake port.

10 Claims, 12 Drawing Sheets

(51) Int. Cl.
*F02B 31/06* (2006.01)
*B29C 45/14* (2006.01)
*B29K 705/12* (2006.01)
*B29L 31/00* (2006.01)
*F02F 1/42* (2006.01)
*F02M 35/104* (2006.01)

(52) U.S. Cl.
CPC ............ *B29C 45/14311* (2013.01); *B29C 2045/14327* (2013.01); *B29K 2705/12* (2013.01); *B29L 2031/7492* (2013.01); *F02F 1/425* (2013.01); *F02M 35/104* (2013.01); *Y02T 10/146* (2013.01)

(58) Field of Classification Search
USPC ........................................ 123/306, 336, 337
See application file for complete search history.

(56) References Cited

U.S. PATENT DOCUMENTS

| | | | | |
|---|---|---|---|---|
| 5,551,392 | A * | 9/1996 | Yamaji | F02B 23/08 123/188.14 |
| 6,003,490 | A * | 12/1999 | Kihara | F02D 9/1015 123/337 |
| 6,354,567 | B1 * | 3/2002 | Vanderveen | F02D 9/101 251/308 |
| 7,188,604 | B2 * | 3/2007 | Isaji | F02B 31/06 123/308 |
| RE40,621 | E * | 1/2009 | Choi | F02D 9/104 123/184.53 |
| 7,980,219 | B2 * | 7/2011 | Sano | F02B 31/06 123/184.53 |
| 8,402,941 | B2 * | 3/2013 | Kobori | F02B 31/06 123/306 |
| 8,985,087 | B2 * | 3/2015 | Matsuzaki | F02B 31/06 123/184.56 |
| 9,038,591 | B2 * | 5/2015 | Dudek | F02M 35/10255 123/184.21 |
| 2002/0088422 | A1 * | 7/2002 | Lozen | F02D 9/10 123/184.55 |
| 2003/0042448 | A1 * | 3/2003 | Conley | F02D 9/1015 251/118 |
| 2003/0106526 | A1 * | 6/2003 | Hatada | F02D 9/101 123/337 |
| 2004/0194751 | A1 * | 10/2004 | Limbrunner | F02B 29/02 123/184.61 |
| 2005/0211215 | A1 * | 9/2005 | Sturdy | F02D 9/101 123/184.53 |
| 2006/0048739 | A1 * | 3/2006 | Isaji | F02B 31/06 123/184.56 |
| 2006/0231067 | A1 * | 10/2006 | Masuta | B22C 9/10 123/308 |
| 2007/0051339 | A1 * | 3/2007 | Torii | F02B 31/08 123/336 |
| 2007/0138693 | A1 * | 6/2007 | Torii | B29C 45/14 264/242 |
| 2007/0181097 | A1 * | 8/2007 | Torii | F02B 31/06 123/306 |
| 2008/0029061 | A1 * | 2/2008 | Sugiyama | F02D 9/101 123/337 |
| 2008/0035094 | A1 * | 2/2008 | Torii | F02D 9/103 123/188.14 |
| 2008/0035107 | A1 * | 2/2008 | Torii | F02D 9/103 123/336 |
| 2009/0013957 | A1 * | 1/2009 | Abe | F02B 31/06 123/184.53 |
| 2009/0164097 | A1 * | 6/2009 | Uda | F02B 31/08 701/103 |
| 2009/0164098 | A1 * | 6/2009 | Uda | F02B 31/08 701/103 |
| 2009/0255121 | A1 * | 10/2009 | Ichikawa | B29C 45/006 29/890.127 |
| 2009/0283076 | A1 * | 11/2009 | Aoki | F02D 9/101 123/568.11 |
| 2010/0122680 | A1 * | 5/2010 | Sano | F02D 9/02 123/184.56 |
| 2010/0192893 | A1 * | 8/2010 | Iwata | F01L 7/18 123/190.1 |
| 2010/0294228 | A1 * | 11/2010 | Kameda | F02B 31/08 123/184.56 |
| 2011/0167787 | A1 * | 7/2011 | Herndon | F02K 7/067 60/204 |
| 2011/0239975 | A1 * | 10/2011 | Takeda | F02B 31/06 123/184.56 |
| 2013/0160736 | A1 * | 6/2013 | Matsuzaki | F02D 9/1075 123/337 |

FOREIGN PATENT DOCUMENTS

| | | |
|---|---|---|
| JP | 2000145467 A | 5/2000 |
| JP | 2000328948 A | 11/2000 |
| JP | 2007170340 A | 7/2007 |
| JP | 2010174722 A | 8/2010 |
| KR | 101382312 B1 | 4/2014 |
| KR | 10-1459932 B1 | 11/2014 |

* cited by examiner

INTAKE APPARATUS FOR ENGINE

CROSS-REFERENCE TO RELATED APPLICATION

This application claims priority to Korean Patent Application No. 10-2016-0156621, filed on Nov. 23, 2016, the disclosure of which is incorporated herein by reference in its entirety.

BACKGROUND

Field of the Disclosure

Exemplary embodiments of the present invention relate to an intake apparatus for an engine, and more particularly, to an intake apparatus for an engine that supplies intake air drawn from an intake manifold into a cylinder of the engine.

Description of the Related Art

Generally, an improvement in performance of an engine includes an increase in a rate that heat generated by combustion is converted into force that displaces a piston of the engine. For example, the combustion speed of fuel should be sufficiently high. An important condition to increase the combustion speed is that air and fuel must be sufficiently mixed within a short time duration due to characteristics of a gasoline engine. A technique for forming vertexes such as swirls and circular (e.g., a tumble motion) in an intake apparatus of the engine have been studied for the purpose of rapidly mixing air and fuel. When air and fuel are satisfactorily mixed within a short time duration, the combustion reliability is improved. Accordingly, combustion speed may be enhanced, and a rate of fuel that is directly exhausted without being involved in a combustion process may also be reduced. Therefore, there are many advantages in terms of fuel efficiency and a reduction in the amount of exhaust gas.

In particular, when a circular flow is reinforced, a mixture is rapidly formed and turbulent energy is increased. The increase of turbulent energy assists in enhancing the combustion speed. In the structure of an intake port for an engine according to a conventional technique, a plurality of guides that direct a flow direction of air are formed in a sidewall of the intake port. Accordingly, turbulence is added to a laminar swirl flow of air that flows along the intake port and the combustion performance is enhanced.

However, since the conventional technique includes an additional structure for enhancing the combustion performance in the cylinder head, the cylinder head is required to be separately machined or manufactured. Therefore, the production cost of a vehicle increases, and the number of work processes increase. To overcome the problems, a technique having a flow control valve and a port plate for generating circular flow are disposed between a cylinder head and an intake manifold has been developed. In particular, various port plate structures for reinforcing the circular flow have been developed. Furthermore, a structure having reliable coupling force between parts has been developed to prevent the port plate from being removed from the original position thereof even when impact is generated by continuous inflow of intake air and circular flow of intake air.

The matters described as the related art have been provided merely for assisting in the understanding for the background of the present invention and should not be considered as corresponding to the related art known to those skilled in the art.

SUMMARY

An object of the present disclosure is to provide an intake apparatus for an engine which may reinforce a circular flow.

In accordance with an aspect of an exemplary embodiment of the present disclosure, an intake apparatus for an engine may include an intake manifold configured to draw intake air thereinto, a cylinder head having an intake port through which intake air drawn from the intake manifold is supplied into a cylinder of the engine, a flow control valve disposed in the intake manifold and configured to control a flow direction of intake air to be drawn from the intake manifold into the cylinder head to generate a circular flow in the intake air, a port plate configured to reinforce the circular flow of intake air that is generated in the flow control valve and a plate support coupled with the port plate and coupled between the intake manifold and the cylinder head to insert the port plate into the intake port.

In some exemplary embodiments, the port plate may include a plate body inserted into the intake port and configured to reinforce the circular flow of intake air a mounting part extending from a plurality of opposite side edges of the plate body and configured to prevent the plate body from being removed from the plate support and a first stepped part extending from of the plurality of the opposite edges of the plate body to space the intake port and the plate body are spaced apart from each other. The port plate may further include a second stepped part coupled to the plate support and extending from the plate body toward the intake manifold. The second stepped part may protrude in a shape that corresponds to a shape of the flow control valve to minimize a space defined between the second stepped part and the flow control valve.

Furthermore, an end of the plate body that faces the cylinder of the engine may have an asymmetric shape to reinforce the circular flow of intake air. The plate body may include a dimple formed in a surface thereof. The plate body may be bent in a direction perpendicular to a flow direction of intake air to form a stepped structure. The plate body may include a first plate, a second plate extending from the first plate and bent from the first plate to form a stepped structure, and a third plate extending from the first plate and bent from the first plate to form a stepped structure. The third plate may be parallel to the second plate.

The mounting part may have a fixing aperture to enable injection molding material to flow into and harden in the fixing aperture when the plate support is formed by injection molding. The mounting part may be coupled to the plate support. The plate support may include a manifold coupling component configured to be coupled with the intake manifold, a cylinder coupling component configured to be coupled to the cylinder head and a guide groove configured to communicate the intake manifold with the intake port and guide rotation of the flow control valve. The port plate may be received in and coupled to the guide groove.

In other exemplary embodiments, the plate support may further include an assembly aperture formed to allow a bolt to pass therethrough to couple the intake manifold and the cylinder head to each other. The intake apparatus may further include a first sealing component coupled to the intake manifold and configured to seal a space between the intake manifold and the plate support and a second sealing component coupled to the plate support and configured to seal a space between the plate support and the cylinder head. The plate support may be formed through an injection molding process with the port plate disposed in a mold.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
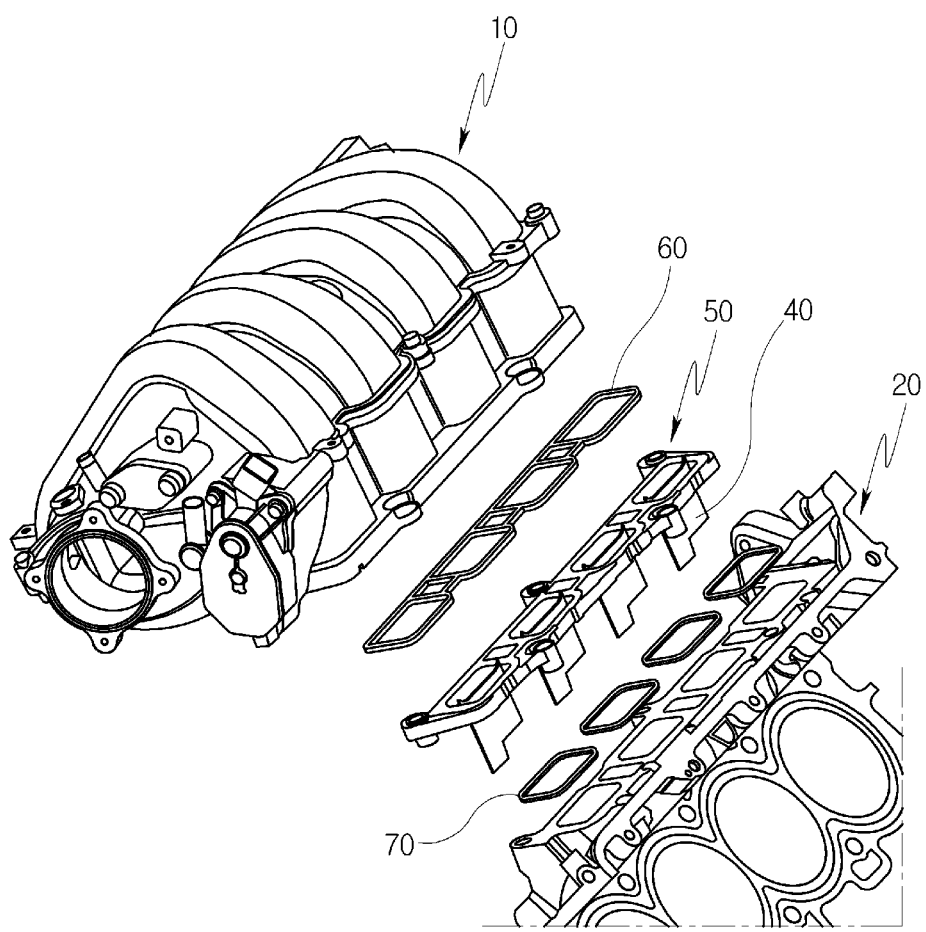
FIG. 1 is an exemplary exploded perspective view illustrating an intake apparatus for an engine according to an exemplary embodiment of the present disclosure.

Terms or words used hereinafter should not be construed as having common or dictionary meanings, but should be construed as having meanings and concepts that comply with the technical spirit of the present disclosure on the basis of the principle that the inventor may appropriately define the concepts of the terms in order to best describe his or her disclosure. Accordingly, the following description and drawings illustrate exemplary embodiments of the present disclosure and do not fully represent the scope of the present disclosure. It would be understood by one of ordinary skill in the art that a variety of equivalents and modifications of the embodiments exist.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 10:
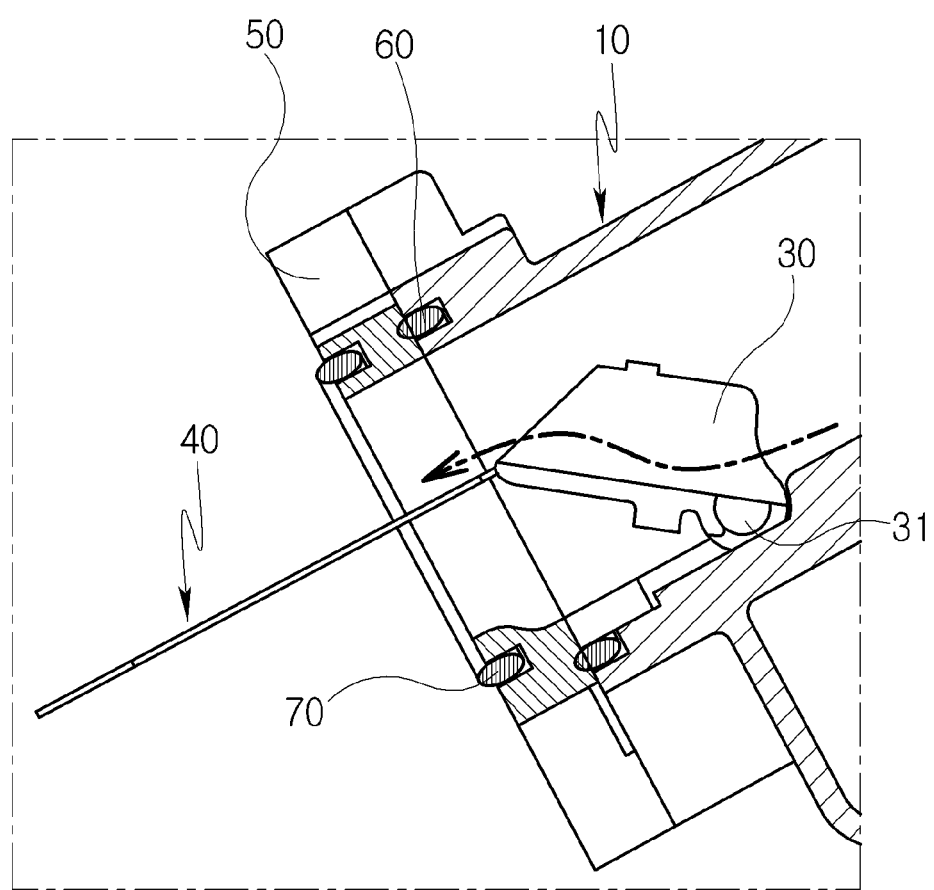
FIG. 10 is an exemplary sectional view illustrating a coupling structure of the intake manifold, the port plate, and the plate support according to an exemplary embodiment of the present disclosure.

Hereinafter, exemplary embodiments of the present disclosure will be described in detail with reference to the attached drawings. Referring to FIGS. 1 and 10, an intake apparatus for an engine according to an exemplary embodiment of the present disclosure may include an intake manifold 10, a cylinder head 20, a flow control valve 30, port plates 40, a plate support 50, a first sealing component 60, and a second sealing component 70.

The flow control valve 30 and the first sealing component 60 may be received in the intake manifold 10. A first surface of the plate support 50 may be coupled to the intake manifold 10. The cylinder head 20 may be coupled to a second surface of the plate support 50 with the second sealing component 70 received in the second surface of the plate support 50. The port plates 40 may be coupled to the plate support 50 and received in the cylinder head 20.

The intake manifold 10 may have a structure with a plurality of pipes configured to supply intake air into cylinders (not shown) of the engine. The cylinder head 20 may be coupled with the plate support 50 and communicates with the intake manifold 10 and the plate support 50. Therefore, the cylinder head 20 may provide a passage for supplying intake air from the intake manifold 10 into the cylinders (not shown). The cylinder head 20 may have tubular intake ports 21 coupled to the respective cylinders (not shown) of the engine. The port plates 40 may be disposed in the respective intake ports 21.

Referring to FIG. 10, the flow control valve 30 may be disposed in the intake manifold 10 and may be coupled to the intake manifold 10 configured to be rotatable by a rotating shaft 31. Thus, the flow control valve 30 may be rotated around the rotating shaft 31 to control the flow of intake air. Additionally, the flow control valve 30 may have a bent plate shape that corresponds to the shape of an inner circumferential surface of the intake manifold 10.

Figure 3:
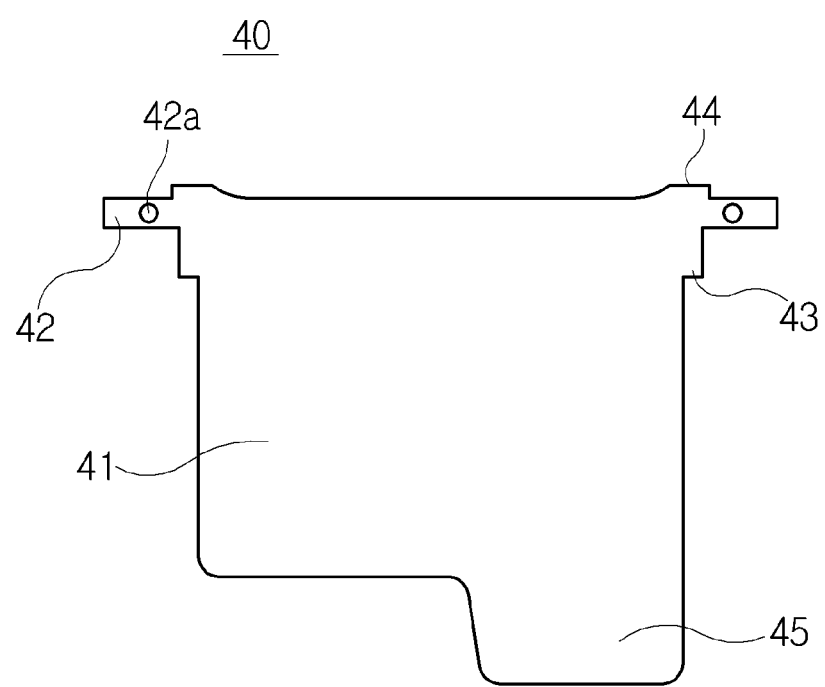
FIG. 3 is an exemplary front view illustrating a port plate according to a first exemplary embodiment of the present disclosure.

Referring to FIG. 3, each port plate 40 may include a plate body 41, mounting parts 42, first stepped parts 43, second stepped parts 44, and an extension part 45. For example, the plate body 41 may have a planar shape. The mounting parts 42 and the first stepped parts 43 may extend from opposite side edges of the plate body 41. The second stepped parts 44 may extend from the plate body 41 toward the intake manifold 10. The extension part 45 may extend from the plate body 41 toward the cylinder of the engine (i.e., in a direction opposite to the intake manifold).

In the port plate 40, based on a central line of the plate body 41 with respect to an insertion direction (e.g., an axial direction of the intake port 21), the mounting parts 42, the first stepped parts 43, and the second stepped parts 44 may be formed to extend symmetrically with each other. The extension component 45 may be formed on one side based on the central line of the plate body 41. Thus, the port plate 40 may have an asymmetric shape. The mounting parts 42 may extend from the respective opposite ends of the plate body 41. A fixing aperture 42a may be formed in each mounting part 42. When the plate support 50 is formed by injection molding, injection molding material may flow into and solidify in the fixing apertures 42a, whereby the plate body 41 may fixed to the plate support 50.

Figure 11:
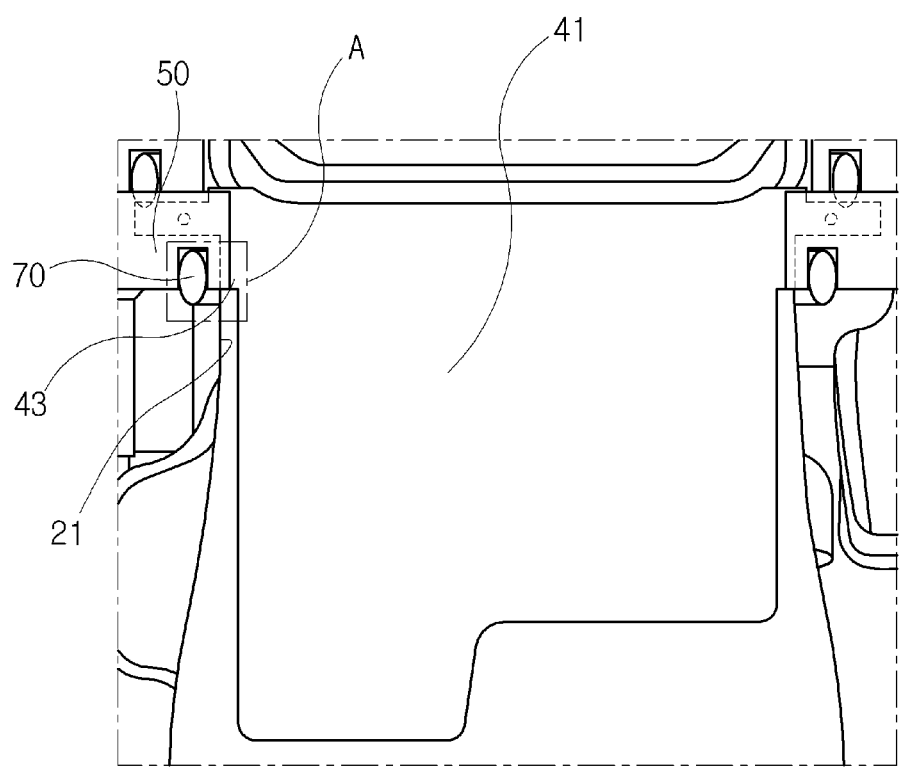
FIG. 11 is an exemplary sectional view illustrating the port plate and an intake port that are spaced apart from each other according to an exemplary embodiment of the present disclosure.
Figure 12:
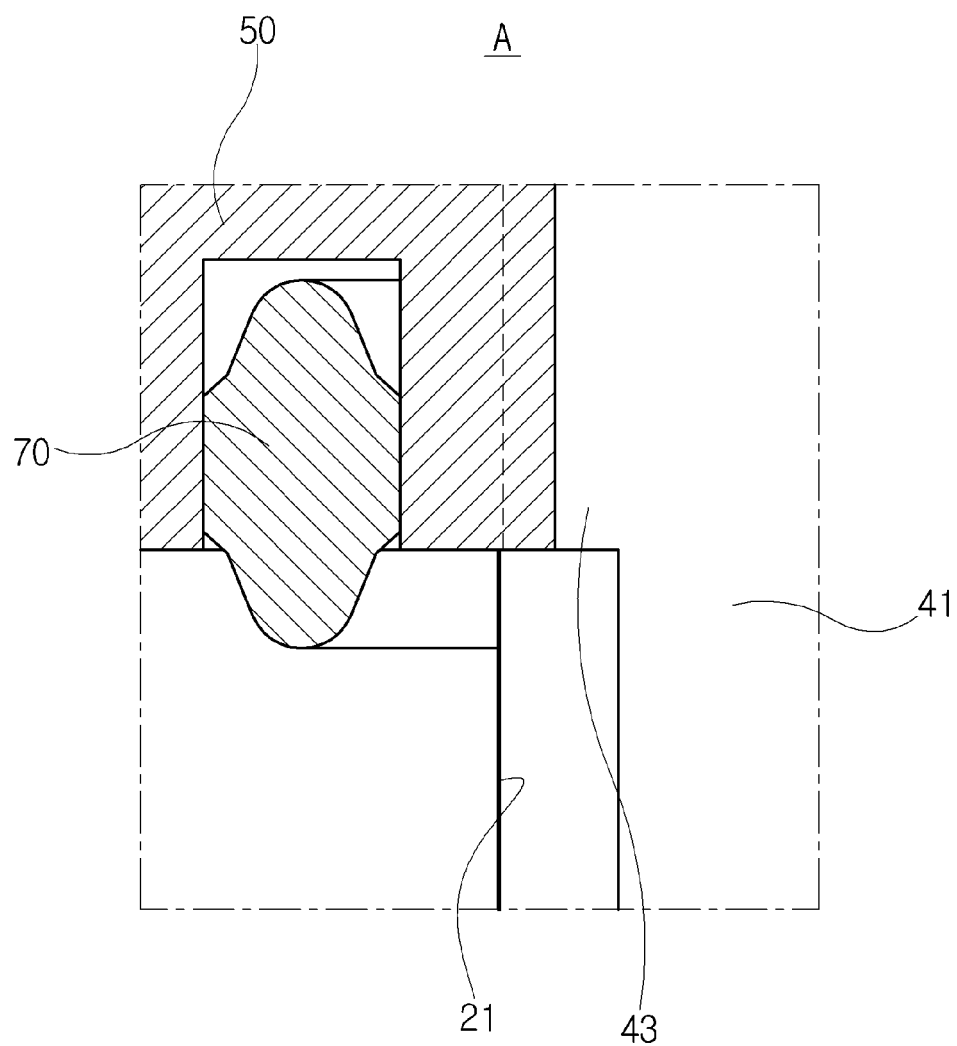
FIG. 12 is an exemplary partial enlarged view of FIG. 11 according to an exemplary embodiment of the present disclosure.

Referring to FIGS. 3 and 11, the first stepped parts 43 may extend from the respective opposite side edges of the plate body 41 and may be coupled to edges of the respective mounting parts 42 that face the cylinder. Furthermore, the first stepped parts 43 may be coupled to the plate support 50 to form a space between the plate body 41 and the corresponding intake port 21 of the cylinder head 20. In an exemplary embodiment, a space ranging from about 1.7 mm to 1.9 mm may be formed between the intake port 21 and the plate body 41, but the present disclosure is not limited thereto.

The second stepped parts 44 may extend from the plate body 41 toward the intake manifold and may be coupled to the plate support 50. For example, an edge of each of the second stepped parts 44 that faces the intake manifold may be disposed not to be exposed out of the plate support 50 and may have a shape corresponding to the shape of the flow control valve 30 to reduce a space between the second stepped part 44 and the flow control valve 30.

The extension part 45 may extend from the edge of the plate body 41 that faces the cylinder (not shown) of the engine. The extension part 45 may be formed on one side of the plate body 41 based on the axial central line of the plate body 41. In an exemplary embodiment, although the extension part 45 has a trapezoidal shape, the present disclosure is not limited thereto, and, for example, the extension part 45 may have various shapes.

Figure 8:
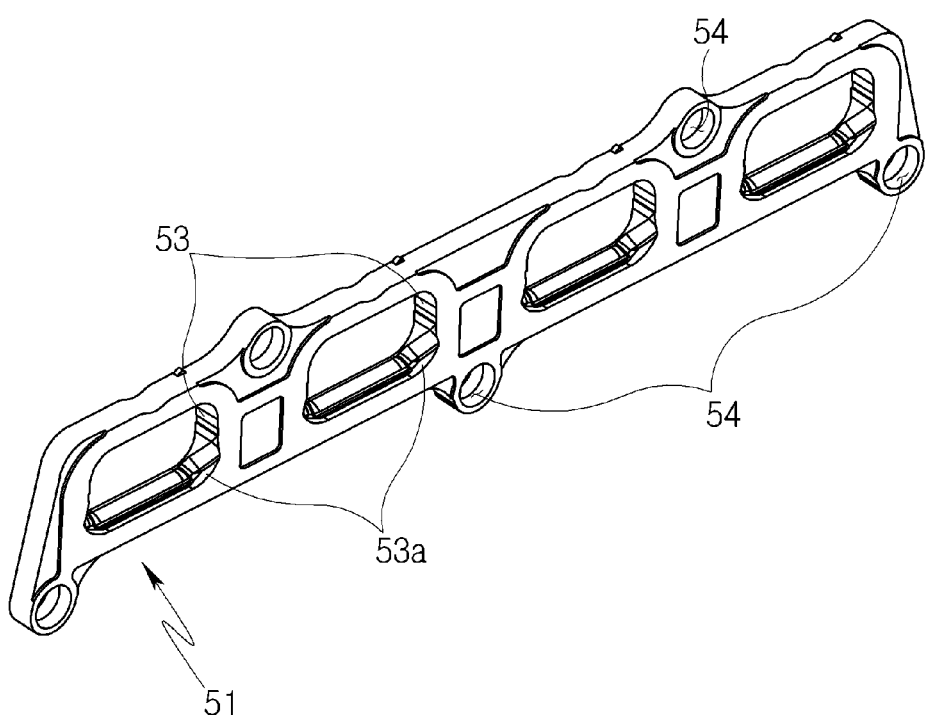
FIG. 8 is an exemplary perspective view illustrating a manifold coupling component of the plate support in the intake apparatus for the engine according to an exemplary embodiment of the present disclosure.
Figure 9:
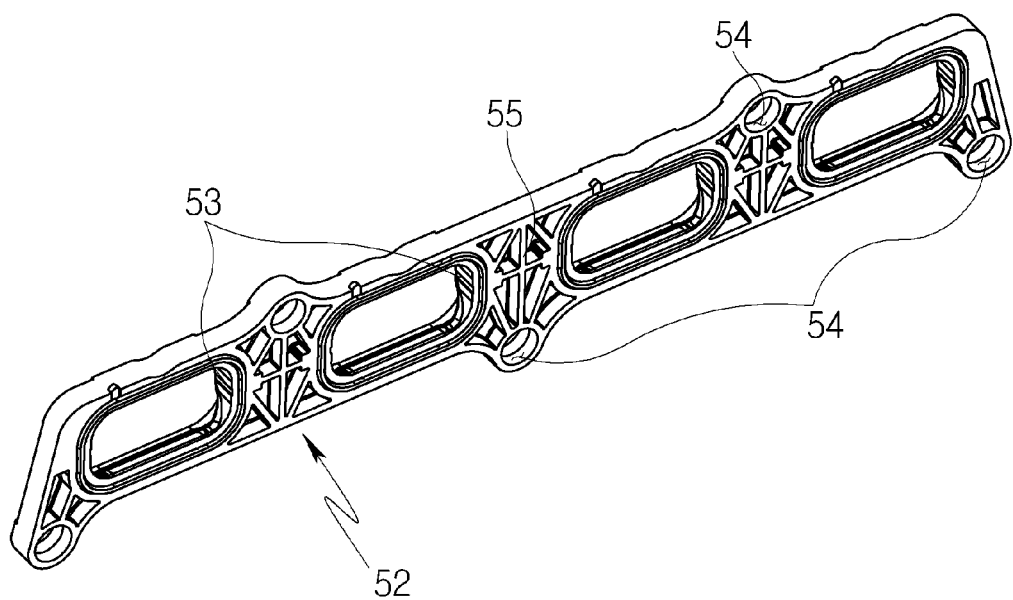
FIG. 9 is an exemplary perspective view illustrating a cylinder coupling component of the plate support in the intake apparatus for the engine according to an exemplary embodiment of the present disclosure.

Referring to FIGS. 1, 8, and 9, the plate support 50 may include a manifold coupling component 51, a cylinder coupling component 52, communication apertures 53, assembly apertures 54, and a support frame 55. The manifold coupling component 51 may be oriented toward the intake manifold 10. The cylinder coupling component 52 may be oriented toward the cylinder head 20. Each of the communication apertures 53 and the assembly apertures 54 may be provided in the form of an aperture passing through the manifold coupling component 51 and the cylinder coupling component 52. The support frame 55 may be formed on the cylinder coupling component 52.

The manifold coupling component 51 may be coupled in close contact with (e.g., abut) the intake manifold 10 and the first sealing component 60 may be coupled to the intake manifold 10. The cylinder coupling component 52 may be coupled with the cylinder head 20 and provided with the second sealing component 70 to seal a space between the cylinder head 20 and the cylinder coupling component 52.

Each of the communication aperture 53 may be provided in the form of an aperture (e.g., corresponding to the inner circumferential surface of the cylinder) passing through the manifold coupling component 51 and the cylinder coupling component 52. A guide groove 53a may be formed in a sidewall (e.g., an inner circumferential surface) of the communication aperture 53 to guide rotation of the flow control valve 40. Furthermore, each port plate 40 may be fixed to the corresponding communication aperture 53 in the axial direction. In particular, the mounting parts 42 and the second stepped parts 44 may be fixed to the inner sidewall of the communication aperture 53. The plate body 41 and the extension part 45 may be exposed out of the cylinder coupling component 52 and received in the corresponding intake port 21 of the cylinder head 20.

Each assembly aperture 54 may be provided in the form of an aperture passing through the manifold coupling component 51 and the cylinder coupling component 52. A tubular coupling member (not shown) may be further provided in the assembly aperture 54 so that, when the intake manifold 10 and the cylinder head 20 are coupled to each other by bolts, the position of the corresponding bolt may be guided by the tubular coupling member. The components may be prevented from being displaced from the correct positions during a temporary assembly process. The support frame 55 may protrude on the cylinder coupling component 52 to prevent deformation of the cylinder coupling component 52.

Referring to FIG. 1, the first sealing component 60 may be seated on and coupled to the intake manifold 10 and may be formed in a shape corresponding to the shapes of the intake manifold 10 and the communication aperture 53 to prevent leakage of intake air. In an exemplary embodiment, the first sealing component 60 may have a structure having a plurality of rings integrated with each other, but the present disclosure is not limited thereto. For example, the first sealing component 60 may have a structure formed of separate rings.

The second sealing component 70 may be seated into and coupled to the cylinder coupling component 52 and may have a shape corresponding to the shapes of the communication aperture 53 and the intake port to prevent leakage of intake air. In an exemplary embodiment, the second sealing component 70 may have a structure having a plurality of rings separated from each other, but the present disclosure is not limited thereto, and, for example, the second sealing component 70 may have a structure have the rings integrated with each other.

Figure 2:
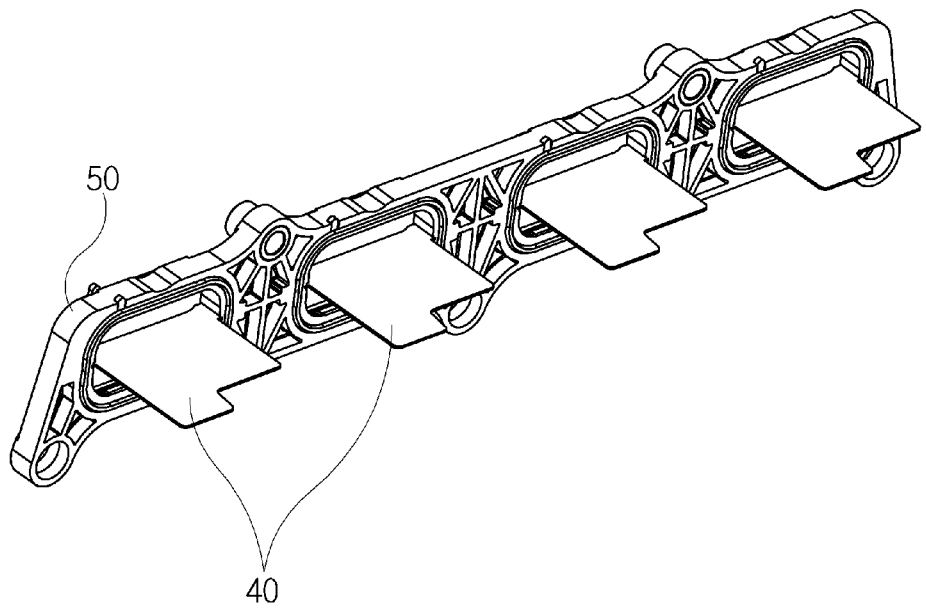
FIG. 2 is an exemplary perspective view illustrating port plates and a plate support according to an exemplary embodiment of the present disclosure.

Manufacture and assembly of the intake apparatus according to an exemplary embodiment of the present disclosure will be described with reference to FIGS. 1 and 2. First, the port plate 40 may be manufactured using SUS material, and then the port plate 40 may be disposed in a mold. After the port plate 40 has been disposed in the mold, the plate support 50 may be formed by injection molding. As a result, the mounting parts 42 and the second stepped parts 44 may be fixed in the plate support 50. Particularly, since the fixing aperture 42a may be formed in each mounting component 42, molding material may be disposed into the fixing apertures 42a and then solidified therein during the injection molding process. Accordingly, the coupling force between the mounting parts 42 and the plate support 50 may be further enhanced.

After the port plate 40 and the plate support 50 have been formed, the second sealing component 70 may be seated into the plate support 50, and then the assembly apertures 54 of the plate support 50 may be temporarily assembled with corresponding bolt apertures formed in the cylinder head 20. For example, when the coupling member (not shown) is provided in each assembly aperture 54, the plate support 50 may be prevented from being undesirably removed from the cylinder head 20. Lastly, the intake manifold 10 provided with the first sealing component 60 and the flow control value 30 may be mounted to the manifold coupling component 51 and then coupled to the cylinder head 20 by fastening bolts with nuts, thus completing the assembly process.

The effects of the intake apparatus according to an exemplary embodiment of the present disclosure will be described with reference to FIGS. 1, 10, and 11. First, intake air may be drawn along the intake manifold 10. In particular, upper intake air and lower intake air may be displaced at a uniform speed due to a uniform hydraulic pressure. When the intake air reaches the flow control valve 30, the lower intake air may be guided to an upper portion of the intake manifold 10 along the flow control valve 30, so that a difference in speed between the lower intake air and the upper intake air may be generated, and the hydraulic pressure in the lower intake air may be increased when a flow passage is reduced, thus causing circular flow.

In an exemplary embodiment, the second stepped part 44 may have a shape corresponding to that of the flow control valve 30 to reduce the size of space between the flow control valve 30 and the port plate 40. Accordingly, the intensity of circular flow may be prevented from being reduced by leakage of intake air. Furthermore, the port plate 40 provided with the extension part 45 may have an asymmetric structure so that the flow of intake air may be unstable. Therefore, according to the exemplary embodiment, the circular flow of intake air may be enhanced, and leakage of generated circular flow may be reduced. Consequently, the performance of the engine may be improved.

In an exemplary embodiment, the first stepped parts 43 may be provided to prevent the intake port 21 and the plate body 41 from coming into contact with each other during the process of assembling the port plate 40. Furthermore, since the guide groove 53a may be formed in each communication aperture 53 to increase the rotating angle of the flow control valve 30, the efficiency in controlling intake air may be increased. Additionally, the first sealing component 60 and the second sealing component 70 may be provided so that leakage of intake air is prevented, whereby the performance of the engine can be enhanced.

In the exemplary embodiment in which the circular flow is reinforced, to cope with an increase in shock to be applied to the port plate 40 by generation of the circular flow, the mounting parts 42 and the fixing apertures 42a may be formed, and the port plate 40 may be formed integrally with the plate support 50 through the injection molding process to increase the durability of the intake apparatus.

Figure 4:
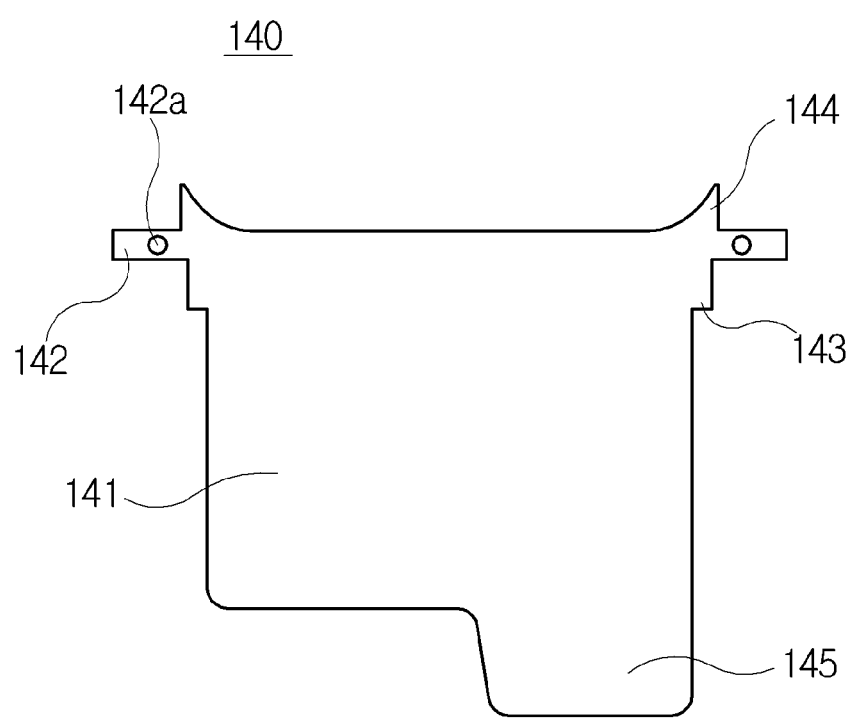
FIG. 4 is an exemplary front view illustrating a port plate according to a second exemplary embodiment of the present disclosure.

In FIG. 4, shows a second exemplary embodiment of the present disclosure. In this exemplary embodiment, a port plate 140 may include a plate body 141, mounting parts 142, first stepped parts 143, second stepped parts 144, and an extension part 145. Each second stepped part 144 protrudes toward the intake manifold to have a pointed shape. In this exemplary embodiment, the size of the space between the flow control valve 30 and the port plate 140 may be minimized so that the circular flow may be further reinforced.

Figure 5:
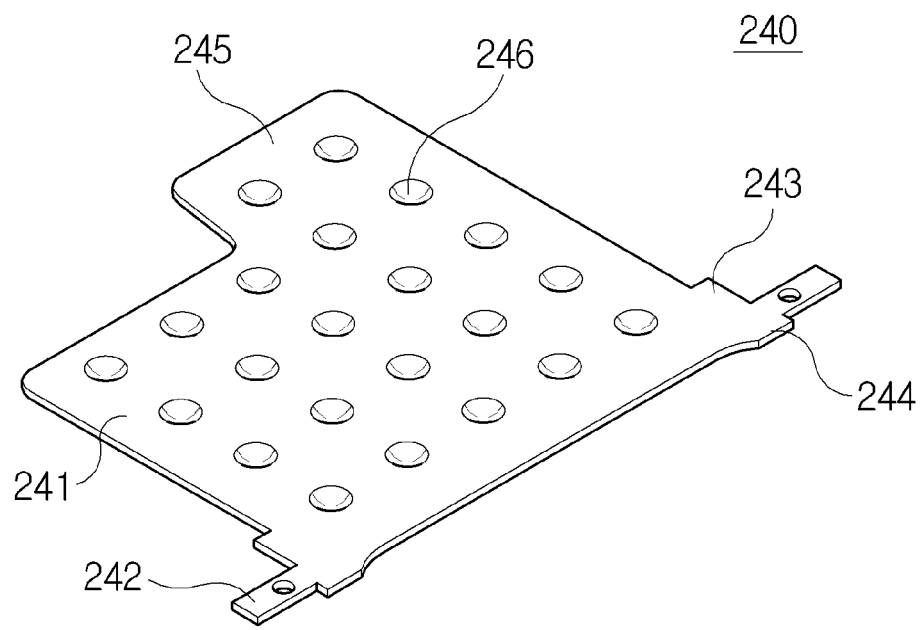
FIG. 5 is an exemplary perspective view illustrating a port plate according to a third exemplary embodiment of the present disclosure.

In FIG. 5, shows a third exemplary embodiment of the present disclosure. In this exemplary embodiment, a port plate 240 may include a plate body 241, mounting parts 242, first stepped parts 243, second stepped parts 244, and an extension 245. Dimples 246 may be formed in the surface of the plate body 241. In this exemplary embodiment, when intake air flows along the dimples 246, circular flow may be caused, so that the circular flow may be further reinforced.

Figure 6:
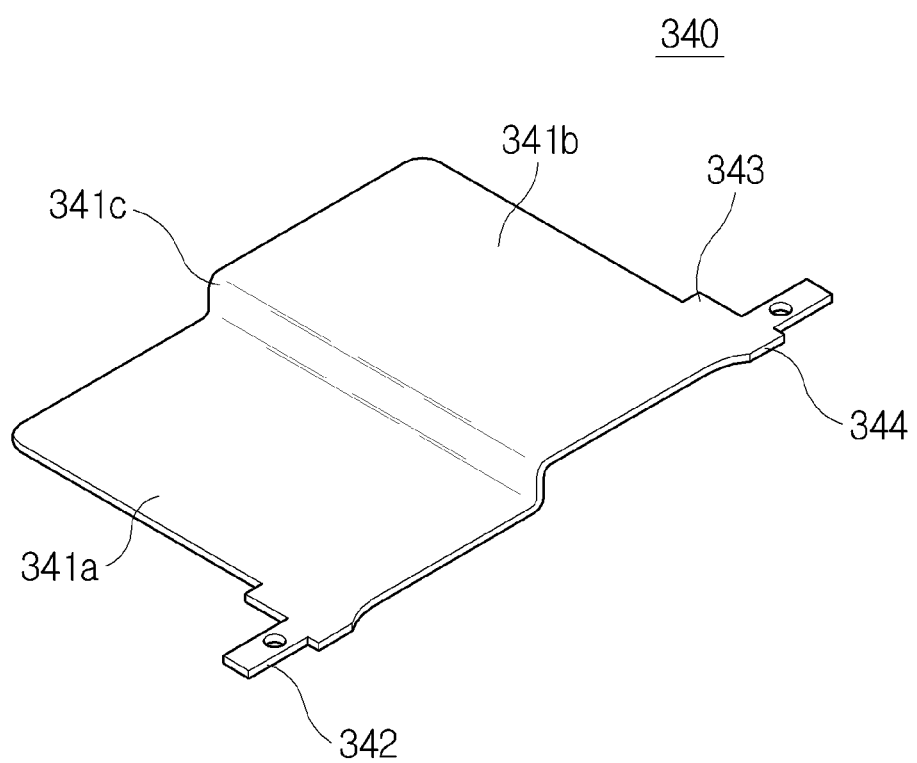
FIG. 6 is an exemplary perspective view illustrating a port plate according to a fourth exemplary embodiment of the present disclosure.

In FIG. 6, shows a fourth exemplary embodiment of the present disclosure. In this exemplary embodiment, a port plate 340 may include a plate body 341, mounting parts 342, first stepped parts 343, and second stepped parts 344. The plate body 341 may include a lower part 341a, an upper part 341b, and a bent part 341c. In other words, in the plate body 341, the bent part 341c may be bent two times in an axial direction, and the lower part 341a and the upper part 341b may form a stepped structure. In this exemplary embodiment, intake air unstably flows because of the lower part 341a and the upper part 341b, and the circular flow may be reinforced.

Figure 7:
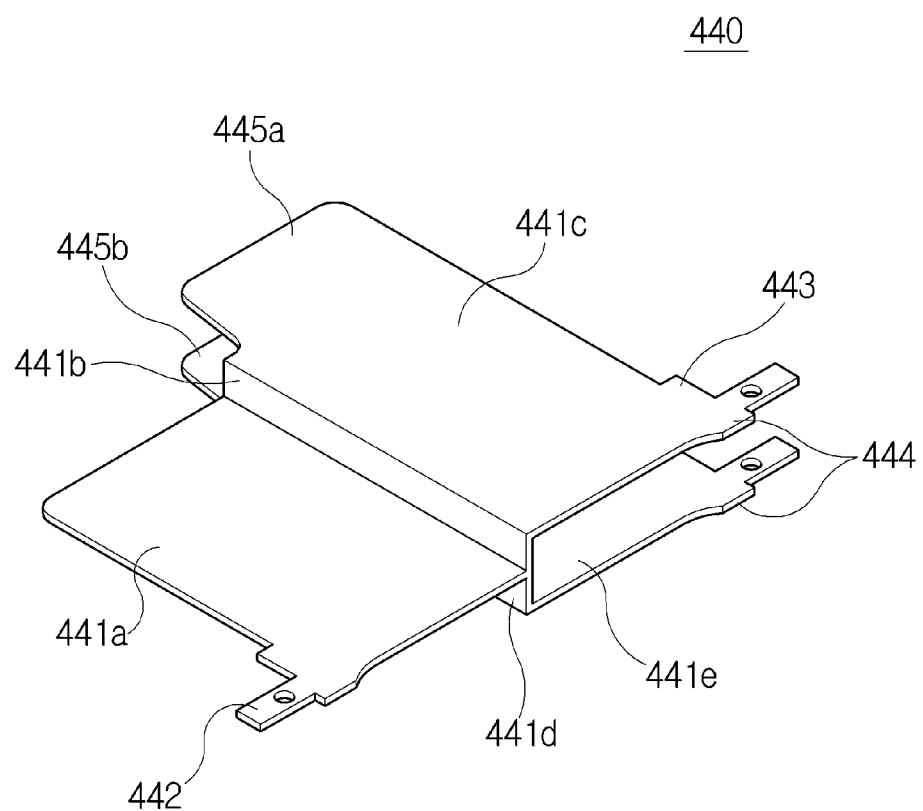
FIG. 7 is an exemplary perspective view illustrating a port plate according to a fifth exemplary embodiment of the present disclosure.

In FIG. 7, shows a fifth exemplary embodiment of the present disclosure. In this exemplary embodiment, a port plate 440 may include a plate body 441, mounting parts 442, first stepped parts 443, second stepped parts 444, and an extension part 445. The plate body 441 may include a first plate 441a, a first bent part 441b, a second plate 441c, a second bent part 441d, and a third plate 441e. The extension part 445 may include a first extension part 445a and a second extension part 445b. For example, the first plate 441a may be coupled to the second plate 441c by the first bent part 441b and coupled to the third plate 441e by the second bent part 441d. Furthermore, the first bent part 441b and the second bent part 441d are diverged from the first plate 441a. The first bent part 441b may be bent to enable the first plate 441a and the second plate 441c to form a stepped structure. The second bent part 441d may be bent to enable the first plate 441a and the third plate 441e to form a stepped structure. In other words, the plate body 441 according to the exemplary embodiment may have a cross-sectional shape similar to that of a tuning fork. According to this exemplary embodiment, vortexes may be generated in intake air by the first plate 441a, the second plate 441c, and the third plate 441e, whereby the circular flow may be further reinforced.

As described above, according to an intake apparatus for an engine in accordance with the present disclosure, a circular flow may be reinforced, the durability of the intake apparatus may be enhanced, and flow loss of intake air may be minimized to improve the performance of the engine.

While the present disclosure has been described with respect to the exemplary embodiments, it will be apparent to those skilled in the art that various changes and modifications may be made without departing from the spirit and scope of the disclosure as defined in the following claims.

What is claimed is:

1. An intake apparatus for an engine, comprising:
an intake manifold configured to draw intake air thereinto;
a cylinder head provided with an intake port to supply intake air drawn from the intake manifold into a cylinder of the engine;
a flow control valve disposed in the intake manifold and configured to control a flow direction of intake air drawn from the intake manifold into the cylinder head to generate a circular flow in the intake air;
a port plate configured to reinforce the circular flow of intake air that is generated in the flow control valve; and
a plate support coupled to the port plate and coupled between the intake manifold and the cylinder head to enable the port plate to be inserted into the intake port,
wherein the port plate comprises:

a plate body inserted into the intake port and is bent in a direction perpendicular to a flow direction of intake air to form a stepped structure as to reinforce the circular flow of intake air;

a mounting part extending from opposite side edges of the plate body and configured to prevent the plate body from being removed from the plate support; and a first stepped part extending from the plurality of opposite edges of the plate body to separate the intake port and the plate body from each other.

2. The intake apparatus according to claim 1, wherein the port plate further comprises:

a second stepped part coupled to the plate support and extending from the plate body toward the intake manifold.

3. The intake apparatus according to claim 2, wherein the second stepped part protrudes in a shape that corresponds to a shape of the flow control valve to minimize a space defined between the second stepped part and the flow control valve.

4. The intake apparatus according to claim 1, wherein the plate body includes a dimple formed in a surface thereof.

5. The intake apparatus according to claim 1, wherein the plate body comprises:

a first plate;

a second plate extending from the first plate and bent from the first plate to form a stepped structure; and a third plate extending from the first plate and bent from the first plate to form a stepped structure, the third plate is disposed parallel to the second plate.

6. The intake apparatus according to claim 1, wherein the mounting part has a fixing aperture to enable injection molding material to flow into and solidify in the fixing aperture when the plate support is formed by injection molding, whereby the mounting part is fixed to the plate support.

7. The intake apparatus according to claim 1, wherein the plate support comprises:

a manifold coupling component to be coupled with the intake manifold;

a cylinder coupling component to be coupled to the cylinder head; and a guide groove configured to communicate the intake manifold with the intake port and guide rotation of the flow control valve, with the port plate received in and coupled to the guide groove.

8. The intake apparatus according to claim 7, wherein the plate support further comprises:

an assembly aperture formed to allow a bolt to pass therethrough to couple the intake manifold and the cylinder head to each other.

9. The intake apparatus according to claim 1, further comprising:

a first sealing component coupled to the intake manifold and configured to seal a space between the intake manifold and the plate support; and a second sealing component coupled to the plate support and configured to seal a space between the plate support and the cylinder head.

10. The intake apparatus according to claim 1, wherein the plate support is formed through an injection molding process with the port plate disposed in a mold.

* * * * *